US012754822B2

(12) United States Patent
Piwinsky et al.

(10) Patent No.: US 12,754,822 B2
(45) Date of Patent: Oct. 6, 2026

(54) PREDICTING APPLICATION RESILIENCY ISSUES USING MACHINE LEARNING TECHNIQUES

(71) Applicant: STATE FARM MUTUAL AUTOMOBILE INSURANCE COMPANY, Bloomington, IL (US)

(72) Inventors: Chris Piwinsky, Bloomington, IL (US); Ryan Chambers, Bloomington, IL (US); Chenxi Yu, Bloomington, IL (US); Ryan Jewell, Bloomington, IL (US); Sean Harmon, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 173 days.

(21) Appl. No.: 18/220,537

(22) Filed: Jul. 11, 2023

(65) Prior Publication Data

US 2024/0330148 A1 Oct. 3, 2024

Related U.S. Application Data

(60) Provisional application No. 63/456,714, filed on Apr. 3, 2023.

(51) Int. Cl.
*G06F 11/3604* (2025.01)
*G06F 8/20* (2018.01)

(52) U.S. Cl.
CPC ............ *G06F 11/3612* (2013.01); *G06F 8/20* (2013.01)

(58) Field of Classification Search
None
See application file for complete search history.

(56) References Cited

U.S. PATENT DOCUMENTS

| | | | | |
|---|---|---|---|---|
| 9,612,897 | B1 | 4/2017 | Bernico et al. | |
| 10,235,228 | B1 | 3/2019 | Bernico et al. | |
| 10,725,842 | B1 | 7/2020 | Bernico et al. | |
| 11,372,699 | B1 | 6/2022 | Bernico et al. | |
| 11,561,849 | B1 * | 1/2023 | Kairali | G06F 11/079 |

(Continued)

*Primary Examiner* — Lewis A Bullock, Jr.
*Assistant Examiner* — Mark A Gooray
(74) *Attorney, Agent, or Firm* — MARSHALL, GERSTEIN & BORUN LLP

(57) ABSTRACT

Techniques are described for predicting resiliency of software applications. Techniques provide for obtaining one or more software construction variables, software operation variables, and an error rate associated with a first software application. This includes training a machine learning model to predict a resiliency of a particular software application using the software construction variables, the software operation variables, and the error rate for each of the plurality of first software applications. A software construction variable and a software operation variable associated with the second software application are obtained. The trained machine learning model is applied to the software construction variable and the software operation variable associated with the second software application to predict an error rate for the second software application. Then a resiliency for the second software application is determined based upon the predicted error rate and display an indication of the resiliency for the second software application.

17 Claims, 7 Drawing Sheets

(56) References Cited

U.S. PATENT DOCUMENTS

| | | | | |
|---|---|---|---|---|
| 2021/0224053 | A1* | 7/2021 | Tiwari | G06N 20/00 |
| 2021/0263728 | A1* | 8/2021 | Farrier | G06F 17/18 |
| 2022/0300406 | A1* | 9/2022 | Deziel | G06N 20/00 |
| 2023/0088784 | A1* | 3/2023 | Negussie | G06N 20/00 717/102 |

* cited by examiner

500

| | SOFTWARE APPLICATIONS (502) | SOFTWARE CONSTRUCTION VARIABLE (504) | SOFTWARE OPERATIONAL VARIABLE (506) | ERROR RATE (508) |
|---|---|---|---|---|
| 510 | CAR INSURANCE APPLICATION | CODE COMPLEXITY METRIC | RUNTIME DATA | 70 |
| 512 | UNDERWRITING APPLICATION | CODE COMPLEXITY METRIC | EXECUTION DATA | 83 |
| 514 | BANKING APPLICATION | CODE STRUCTURE METRIC | ENVIRONMENT DATA | 35 |
| 516 | LIFE INSURANCE APPLICATION | CODE DEPLOYMENT METRIC | RUNTIME DATA | 10 |
| 518 | CLAIMS APPLICATION | CODE DEPLOYMENT METRIC | EXECUTION DATA | 77 |

FIG. 5

PREDICTING APPLICATION RESILIENCY ISSUES USING MACHINE LEARNING TECHNIQUES

CROSS-REFERENCE TO RELATED APPLICATIONS

This application claims priority to and the benefit of the filing date of provisional U.S. Patent Application No. 63/456,714 entitled "Predicting Application Resiliency Issues Using Machine Learning Techniques," filed on Apr. 3, 2023. The entire contents of which is hereby expressly incorporated herein by reference.

TECHNICAL FIELD

The present disclosure generally relates to systems and methods, for predicting resiliency of software design and, more particularly, by analyzing data from the construction of software applications and data from the operations of the software applications using machine learning techniques.

BACKGROUND

Today, IT system outages are an increasing cost to business. The downtime of IT systems may be both costly to a business and cause reputational risk. There may be a high error rate for certain software applications after the software application is deployed compared to other software applications. The higher error rate for certain software applications may be due to their software development. The software development lifecycle begins with software construction that creates a number of complexities. Some complexities may include software source code quality, patterns and vulnerabilities in the software code, testing or validation of the software code. These software complexities in the design and development of the software, and the software code delivery and deployment may affect the software application's resiliency.

Typically, software may be deployed for a particular purpose. Data generated from the environment in which the software executes may also impact the software. In other words, the software environment may affect the operation of the software, and the software environment further may affect the software operations data. Examples of software operations data may include application log data, application error data, application performance data, and data generated by application specific monitoring tools that identify system failures or system outages where one or more applications are unable to communicate with other software applications or unable to communicate with user devices. To detect outages, system administrators may manually review application data, may receive complaints from customers after the system experiences an outage, and/or may create artificial intelligence robotic interactions with the system that may simulate users.

However, in complex software that contains multiple software applications millions or even billions of events may be logged each day, making manual review by a human being an extremely time-consuming, if not impossible task. Moreover, in many cases, a system outage may occur causing the system to be unavailable for lengthy periods of time, which may cause harm to the users before any customer complaints are received. What is needed is a way to predict the resiliency of software applications to identify problems before a system outage occurs.

BRIEF SUMMARY

One exemplary embodiment of the present disclosure may be a computer-implemented method for predicting resiliency of software applications. The computer-implemented method may be implemented by one or more local or remote processors, severs, sensors, memory units, mobile devices, bots (such as voice bots, chatbots, ChatGPT-based bots), and/or other electronic or electrical components, which may be in wired or wireless communication with one another. In one aspect, the computer-implemented method for predicting resiliency of software applications may include for each of a plurality of first software applications: (1) obtaining, by one or more processors, one or more software construction variables associated with the first software application; (2) obtaining, by the one or more processors, one or more software operation variables associated with the first software application; and/or (3) obtaining, by the one or more processors, an error rate for the first software application. The method may include (4) training, by the one or more processors, a machine learning model to predict a resiliency of a particular software application using (i) the one or more software construction variables associated with each of the plurality of first software applications, (ii) the one or more software operation variables associated with each of the plurality of first software applications, and/or (iii) the error rate for each of the plurality of first software applications. The method may further include for a second software application, (5) obtaining, by the one or more processors, at least one software construction variable and at least one software operation variable associated with the second software application, (6) applying, by the one or more processors, the trained machine learning model to the at least one software construction variable and the at least one software operation variable associated with the second software application to predict an error rate for the second software application and determine a resiliency for the second software application based upon the predicted error rate; and/or (7) providing, by the one or more processors, an indication of the resiliency of the second software application for display. The method may include additional, less, or alternate actions, including those discussed elsewhere herein.

For instance, in some embodiments, the computer-implemented method may further include: (1) applying, by the one or more processors, the trained machine learning model to the at least one software construction variable and the at least one software operation variable associated with the second software application to determine a likelihood of resiliency issues for the second software application; and/or (2) providing an indication of the likelihood of resiliency issues for the second software application for display.

Also in some embodiments, the resiliency for the second software application may be inversely proportional to the predicted error rate.

The computer-implemented method may further include: (1) applying, by the one or more processors, the trained machine learning model to the at least one software construction variable and the at least one software operation variable associated with the second software application to determine a severity of resiliency issues for the second software application; and/or (2) providing, by the one or more processors, an indication of the severity of resiliency issues for the second software application for display.

In some embodiments, the software construction variables may include at least one of: (i) a metric related to software source code, (ii) a metric related to metadata about the source code, (iii) a code complexity metric, (iv) a code quality metric, (v) a metric related to vulnerability of source code, (vi) automated and manual testing data, (vii) automated and manual validation data (viii) software delivery data, (ix) software deployment data, (x) a code structure metric, and/or (xi) a code deployment metric.

The code structure metric may be determined based upon at least one of (i) cyclomatic complexity data, (ii) pattern scanning data, (iii) modularity data, and/or (iv) a number of lines of code. Also, the code deployment metric may include at least one of (i) a production change frequency metric, (ii) a production change size metric, and/or (iii) a production change error rate.

The software operation variables may include at least one of (i) execution data, (ii) environment data, (iii) any data that impacts the operation of the software application, (iv) log data, (v) availability data, and/or (vi) runtime data. Also, the runtime data may include at least one of (i) performance data, (ii) application error data, (iii) application-to-application runtime dependency data. (iv) infrastructure runtime dependency data, (v) a number of runtime incidents, (vi) outage data, and/or (vii) error data.

In some embodiments, the machine learning model may correlate the one or more software construction variables and the one or more software operation variables to the error rate for each of the plurality of first software applications. Also in these embodiments, the computer-implemented method may further include: (1) identifying, by the one or more processors, a subset of the one or more software construction variables and the one or more software operation variables having a correlation with the error rate which is above a threshold; and/or (2) training, by the one or more processors, the machine learning model using the identified subset.

Another exemplary embodiment of the present disclosure may be a computer system for predicting resiliency of software applications. The computer system may include one or more processors, servers, sensors, transceivers, memory units, bots (such as voice bots, chatbots, ChatGPT-based bots), and/or other electronic or electrical components that may be wired or wireless communication with one another. In one instance, the system may include one or more processors, and a non-transitory computer-readable memory coupled to the one or more processors that stores instructions, that, when executed by the one or more processors, may cause the system, for each of a plurality of first software applications to: (1) obtain one or more software construction variables associated with the first software application; (2) obtain one or more software operation variables associated with the first software application; and/or (3) obtain an error rate for the first software application. The system also may (4) train a machine learning model to predict a resiliency of a particular software application using (i) the one or more software construction variables associated with each of the plurality of first software applications, (ii) the one or more software operation variables associated with each of the plurality of first software applications, and/or (iii) the error rate for each of the plurality of first software applications. Further, for a second software application, the system (5) obtains at least one software construction variable and at least one software operation variable associated with the second software application; (6) applies the trained machine learning model to the at least one software construction variable and the at least one software operation variable associated with the second software application to predict an error rate for the second software application and determine a resiliency for the second software application based upon the predicted error rate; and/or (7) provides, by the one or more processors, an indication of the resiliency of the second software application for display. The system may include additional, less, or alternate functionality, including that discussed elsewhere herein.

For instance, in some embodiments, the resiliency for the second software application may be a likelihood of resiliency issues for the second software application, and to provide the indication of the resiliency, the instructions may cause the system to provide an indication of the likelihood of resiliency issues for the second software application for display.

In other embodiments, the resiliency for the second software application may be a severity of resiliency issues for the second software application, and to provide the indication of the resiliency, the instructions may cause the system to provide an indication of the severity of resiliency issues for the second software application for display.

The software construction variables may include at least one of (i) a metric related to software source code, (ii) a metric related to metadata about the source code, (iii) a code complexity metric, (iv) a code quality metric, (v) a metric related to vulnerability of source code, (vi) automated and manual testing data, (vii) automated and manual validation data (viii) software delivery data, (ix) software deployment data, (x) a code structure metric, and/or (xi) a code deployment metric. The code structure metric may be determined based upon at least one of (i) cyclomatic complexity data, (ii) pattern scanning data, (iii) modularity data, and/or (iv) a number of lines of code. Further, the code deployment metric may include at least one of (i) a production change frequency metric, (ii) a production change size metric, and/or (iii) a production change error rate.

The software operation variables may include at least one of (i) execution data, (ii) environment data, (iii) any data that impacts the operation of the software application, (iv) log data, (v) availability data, and/or (vi) runtime data. Further, the runtime data may include at least one of (i) performance data, (ii) application error data, (iii) application-to-application runtime dependency data, (iv) infrastructure runtime dependency data, (v) a number of runtime incidents, (vi) outage data, and/or (vii) error data.

In some embodiments, the machine learning model may correlate the one or more software construction variables and the one or more software operation variables to the error rate for each of the plurality of first software applications.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIG. 5 depicts a table of an exemplary set of software applications and their respective error rates based upon an exemplary software construction variable and an exemplary operation variable, according to one embodiment;

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

I. Exemplary Environment for Predicting Resiliency of Software

Figure 1:
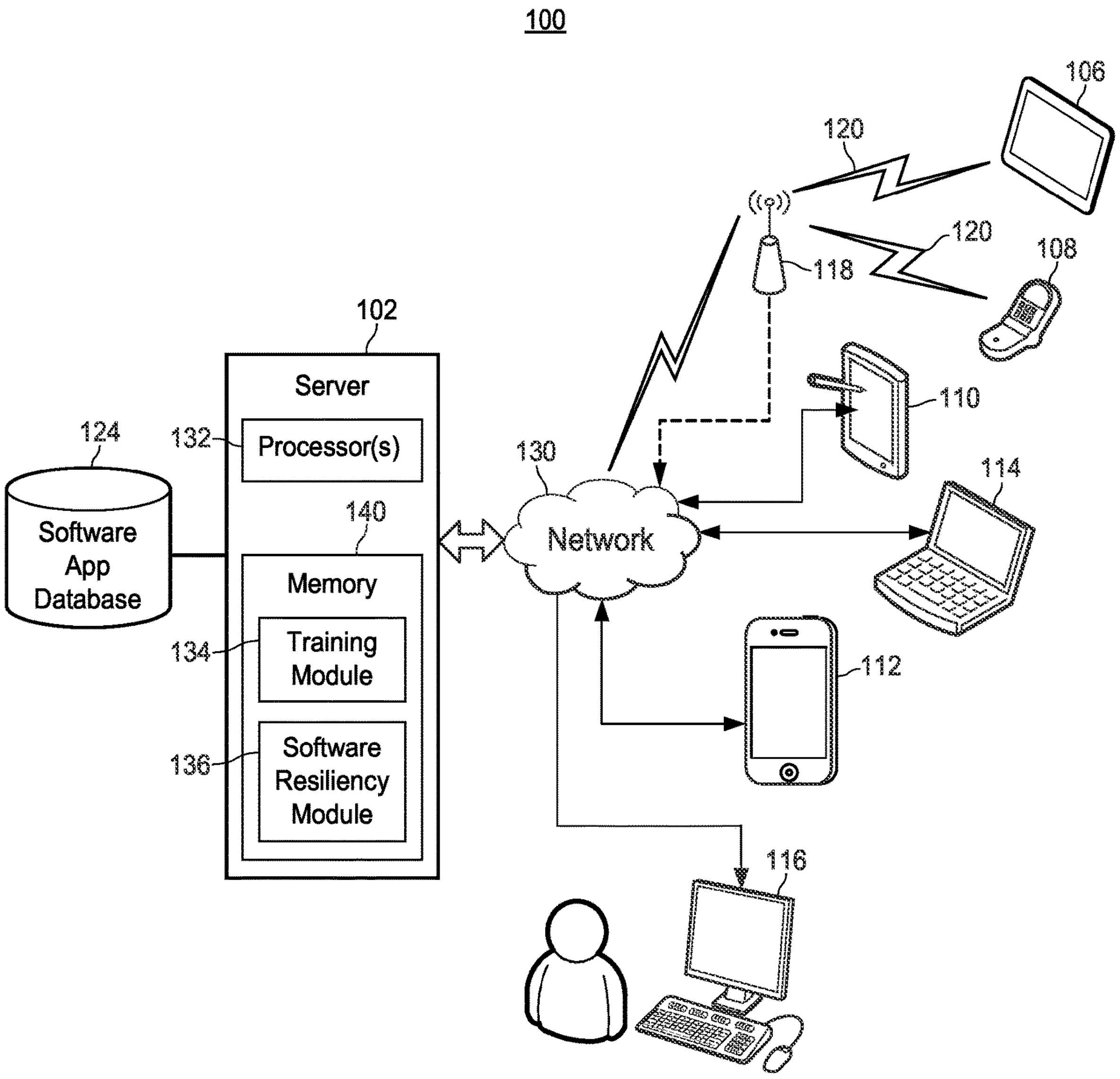
FIG. 1 depicts a block diagram of a computer network and system on which an exemplary computer system for predicting resiliency of software applications may operate, according to one embodiment.

FIG. 1 illustrates various aspects of an exemplary computing environment 100 implementing a system for predicting the resiliency of a software application. The environment 100 may include a server device 102, and/or a plurality of client devices 106-116 which may be communicatively connected through a network 130, as described below. According to certain embodiments, the server device 102 may be a combination of hardware and software components, also as described in more detail below. The server device 102 may have an associated database 124 for storing software application data related to the resiliency of various software applications. Moreover, the server device 102 may include one or more processor(s) 132 such as a microprocessor coupled to a memory 140.

The memory 140 may be tangible, non-transitory memory and may include any types of suitable memory modules, including random access memory (RAM), read-only memory (ROM), electronic programmable read-only memory (EPROM), erasable electronic programmable read-only memory (EEPROM), flash memory, MicroSD cards, and other types of persistent memory, etc. The memory 140 may store, for example instructions executable on the processors 132 for a training module 134 and a software resiliency module 136. The server device 102 is described in more detail below with reference to FIG. 2.

A. Exemplary Training Module

To predict a resiliency of software applications, a training module 134 may obtain one or more software construction variables and one or more software operation variables, for example, from the software application database 124, for several software applications where the error rate for each software application is known. Applications may include, for example, networking applications, insurance applications for making claims and/or for underwriting, etc. The training module 134 may analyze the software construction variables, software operation variables, and corresponding error rates for the software applications to generate a machine learning model using machine learning techniques. The machine learning techniques may include linear regression, polynomial regression, logistic regression, random forests, boosting such as adaptive boosting, gradient boosting, and extreme gradient boosting, nearest neighbors, Bayesian networks, neural networks, support vector machines, or any other suitable machine learning technique.

In some implementations, each of the software applications may be classified according to the error rate or range of error rates for the software applications (e.g., a first set of software applications having a first error rate or range of error rates may be classified into a first group, a second set of software applications having a second error rate or range of error rates may be classified into a second group, etc.). The training module 134 may then analyze the software construction variables and software operations variables for the software applications in each group to generate the machine learning model for predicting the error rate for a software application. The machine learning model may also be used to determine the resiliency for the software application. For example, the resiliency may be inversely proportional to the error rate, such that an application having a low error rate may have a high resiliency and vice versa. The resiliency may include an application risk score for example, on a scale from one to ten, where a score of one indicates very high resiliency while a score of ten indicates very low resiliency. Additionally, the resiliency may include a likelihood of resiliency issues and/or a severity of resiliency issues. For example, the likelihood may be the likelihood that the software application has a particular error rate or range of error rates. The severity may be the magnitude of the error rate, where a high error rate corresponds to a high severity, a low error rate corresponds to a low severity, etc.

In some implementations, the training module 134 may generate a first machine learning model for predicting the likelihood of resiliency issues and a second machine learning model for predicting the severity of resiliency issues.

The training module 134 may then provide the trained machine learning module to the software resiliency module 136. In other implementations, the training module 134 may provide the trained machine learning module to a client device 106-116.

The training module 134 may predict a resiliency (or an application risk score) of a particular software application after being trained by one or more software construction variables, one or more software application variables associated with a software application, and an error rate for each software application.

Furthermore, after the training module 134 has been trained by one or more first software applications having known error rates, the training module 134 may predict an error rate for a second software application where the error rate is unknown. Then the predicted error rate may be used to determine the resiliency of the second software application.

B. Exemplary Software Resiliency Module

The software resiliency module 136 may obtain the machine learning model(s) from the training module 134 and determine the resiliency of a software application having an unknown error rate. The software resiliency module 136 may obtain a software application from the software app database 124, where the error rate of the software application is unknown. The software resiliency module 136 may determine one or more software construction variables associated with the software application and may determine one or more software operation variables associated with the software application.

Then the software resiliency module 136 may apply the software construction variables and the software operation variables to the machine learning model to predict the error rate for the software application. Then the software resiliency module 136 may determine an application risk score for the software application based upon the predicted error rate.

The software resiliency module 136 may also predict the likelihood of each error rate. For example, the software resiliency module 136 may predict an error rate of 0.3 with a likelihood of 70% and an error rate of 0.6 with a likelihood of 10%. The software resiliency module 136 may generate a likelihood metric which may be numeric or categorical. For example, the likelihood of resiliency issues may be high when the likelihood of an error rate above an error rate threshold (e.g., 0.4) is above a likelihood threshold (e.g., 50%). In some implementations, the software resiliency module 136 may aggregate the likelihoods of error rates which are above an error rate threshold. Then the software resiliency module 136 may determine that the likelihood of resiliency issues is high when the aggregate likelihood is above a likelihood threshold.

The software resiliency module 136 may also generate a severity metric which may be numeric or categorical. For example, the severity of resiliency issues may be high when the error rate is above a first error rate threshold (e.g., 0.6), the severity may be medium when the error rate is between a first error rate threshold (e.g., 0.6) and a second error rate threshold (e.g., 0.4), and the severity may be low when the error rate is below the second error rate threshold (e.g., 0.4).

The software resiliency module 136 may provide an indication of the resiliency for the software application to a client device 106-116 for display to a user. In one embodiment, the software resiliency module 136 may provide an indication of the likelihood of resiliency issues for a software application to the client device 106-116 for display to the user. In another embodiment, the software resiliency module 136 may provide an indication of the severity of resiliency issues for a software application to the client device 106-116 for display to a user. In yet another embodiment, the software resiliency module 136 may provide the application risk score for a software application to the client device 106-116 for display to a user.

C. Exemplary Client Devices

The client devices 106-116 may include, by way of example, a tablet computer 106, a cell phone 108, a personal digital assistant (PDA) 110, a mobile device smart-phone 112 also referred to herein as a "mobile device," a laptop computer 114, a desktop computer 116, a portable media player (not shown), a home phone, a wearable computing device, smart glasses, smart watches, phablets, other smart devices, devices configured for wired or wireless RF (Radio Frequency) communication, etc. Of course, any client device appropriately configured may interact with the resiliency prediction system 100. The client devices 106-116 need not necessarily communicate with the network 130 via a wired connection. In some instances, the client devices 106-116 may communicate with the network 130 via wireless signals 120 and, in some instances, may communicate with the network 130 via an intervening wireless or wired device 118, which may be a wireless router, a wireless repeater, a base transceiver station of a mobile telephony provider, etc.

Each of the client devices 106-116 may interact with the server device 102 to receive web pages and/or server data and may display the web pages and/or server data via a client application and/or an Internet browser (described below). For example, the mobile device 112 may display an application screen of a client application (e.g., a mobile banking application) and/or a web page to a user, may receive an input from the user, and/or may interact with the server device 102 depending on the type of user-specified input. Based upon the client interactions with the server device 102, the server device 102 may generate application event logs such as an informational message that the session has timed out due to user inactivity, an error message that there was an error accessing a file, etc.

It will be appreciated that although only one server device 102 is depicted in FIG. 1, multiple servers 102 may be provided for the purpose of distributing server load, serving different web pages, etc. These multiple servers 102 may include a web server, an entity-specific server (e.g., an Apple® server, etc.), a server that is disposed in a retail or proprietary network, etc.

The server device 102 may communicate with the client devices 106-116 via the network 130. The digital network 130 may be a proprietary network, a secure public Internet, a virtual private network and/or some other type of network, such as dedicated access lines, plain ordinary telephone lines, satellite links, combinations of these, etc. Where the digital network 130 comprises the Internet, data communication may take place over the digital network 130 via an Internet communication protocol.

II. Exemplary System Hardware

A. Exemplary Server Device

Figure 2:
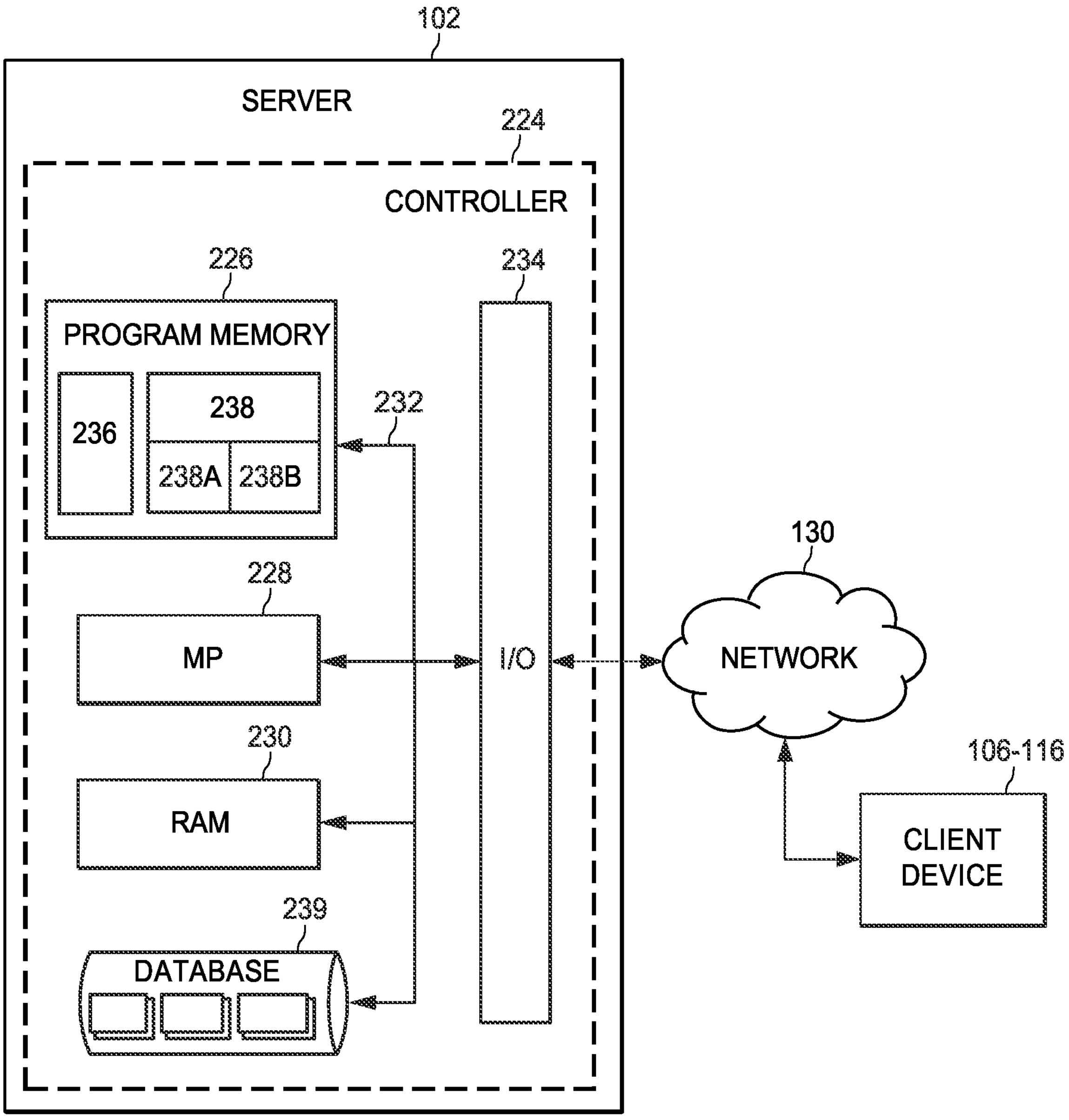
FIG. 2 illustrates a block diagram of an exemplary server, according to one embodiment.

Turning now to FIG. 2, the server device 102, may include a controller 224. The controller 224 may include a program memory 226, a microcontroller or a microprocessor (MP) 228, a random-access memory (RAM) 230, and/or an input/output (I/O) circuit 234, all of which may be interconnected via an address/data bus 232. The program memory 226 and the microprocessor 228 may be similar to the memory 140 and processor 132 respectively, as described in FIG. 1. In some embodiments, the controller 224 may also include, or otherwise be communicatively connected to, a database 239 or other data storage mechanism (e.g., one or more hard disk drives, optical storage drives, solid state storage devices, etc.). The database 239 may include data such as software applications, web page templates and/or web pages, and other data necessary to interact with users, and/or data administrators through the network 130. It should be appreciated that although FIG. 2 depicts only one microprocessor 228, the controller 224 may include multiple microprocessors 228. Similarly, the memory of the controller 224 may include multiple RAMs 230 and/or multiple program memories 226. Although FIG. 2 depicts the I/O circuit 234 as a single block, the I/O circuit 234 may include a number of different types of I/O circuits. The controller 224 may implement the RAM(s) 230 and/or the program memories 226, for example, as semiconductor memories, magnetically readable memories, and/or optically readable memories.

As shown in FIG. 2, the program memory 226 and/or the RAM 230 may store various software applications for execution by the microprocessor 228. For example, a user-interface application 236 may provide a user interface to the server device 102, which user interface may, for example, allow the system administrator to configure, troubleshoot, and/or test various aspects of the server's operation including identifying the resiliency of a software application and displaying the likelihood of resiliency issues for the software application. A server application 238 may operate to determine and/or transmit an error rate of the software application corresponding to the resiliency of the software application. A server application 238 may operate to determine and/or transmit a likelihood of an error rate of a software application and/or a warning or alert to the client device 106-116 and/or to the user-interface application 236 for the system administrator to review. The server application 238 may be a single module 238 or a plurality of modules 238A, 238B such as the training module 134 and the software resiliency module 136, respectively.

While the server application 238 is depicted in FIG. 2 as including two modules, 238A and 238B, the server application 238 may include any number of modules accomplishing tasks related to implantation of the server device 102.

B. Exemplary Computing Device

Figure 3:
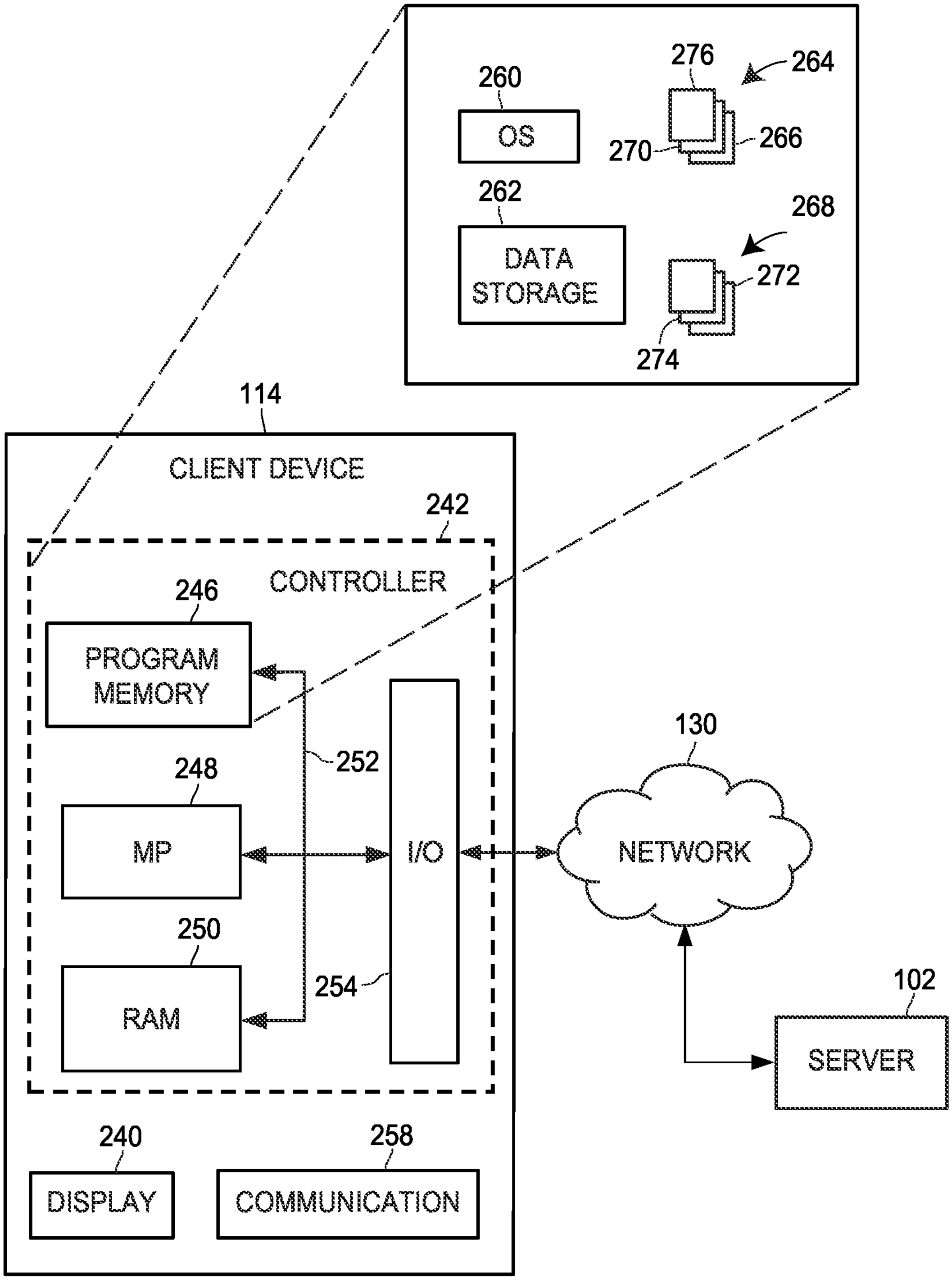
FIG. 3 illustrates a block diagram of an exemplary client device, according to one embodiment.

Referring now to FIG. 3, the laptop computer 114 (or any of the client devices 106-116) may include a display 240, a communication unit 258, a user-input device (not shown), and, like the server device 102, a controller 242. Similar to the controller 224, the controller 242 may include a program memory 246, a microcontroller or a microprocessor (MP) 248, a random-access memory (RAM) 250, and/or an input/output (I/O) circuit 254, all of which may be interconnected via an address/data bus 252. The program memory 246 may include an operating system 260, a data storage 262, a plurality of software applications 264, and/or a plurality of software routines 268. The operating system 260, for example, may include Microsoft Windows®, OS X®, Linux®, Unix®, etc. The data storage 262 may include data such as user profiles, application data for the plurality of applications 264, routine data for the plurality of routines 268, and/or other data necessary to interact with the server device 102 through the digital network 130. In some embodiments, the controller 242 may also include, or otherwise be communicatively connected to, other data storage mechanisms (e.g., one or more hard disk drives, optical storage drives, solid state storage devices, etc.) that reside within the laptop computer 114.

The communication unit 258 may communicate with the server device 102 via any suitable wireless communication protocol network, such as a wireless telephony network (e.g., GSM, CDMA, LTE, etc.), a wi-fi network (802.11 standards), a WiMAX network, a Bluetooth network, etc. The user-input device (not shown) may include a "soft" keyboard that is displayed on the display 240 of the laptop computer 114, an external hardware keyboard communicating via a wired or a wireless connection (e.g., a Bluetooth keyboard), an external mouse, or any other suitable user-input device. As discussed with reference to the controller 224, it should be appreciated that although FIG. 3 depicts only one microprocessor 248, the controller 242 may include multiple microprocessors 248. Similarly, the memory of the controller 242 may include multiple RAMs 250 and/or multiple program memories 246. Although the FIG. 3 depicts the I/O circuit 254 as a single block, the I/O circuit 254 may include a number of different types of I/O circuits. The controller 242 may implement the RAM(s) 250 and/or the program memories 246, for example, as semiconductor memories, magnetically readable memories, and/or optically readable memories.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and/or transmitting information from the laptop computer 114.

One of the plurality of applications 264 may be a native application and/or web browser 270, such as Apple's Safari®, Google Chrome™, Microsoft Internet Explorer®, and Mozilla Firefox® that may be implemented as a series of machine-readable instructions for receiving, interpreting, and/or displaying web page information from the server device 102 while also receiving inputs from the user. Another application of the plurality of applications may include an embedded web browser 276 that may be implemented as a series of machine-readable instructions for receiving, interpreting, and/or displaying web page information from the server device 102. One of the plurality of routines may include a resiliency display routine 272 which obtains the likelihood of resiliency issues for a software application from the server device 102 and displays the likelihood on the user interface 240. Another routine in the plurality of routines may include an open application routine 274 that receives user-input instructing the laptop computer 114 to open an application which includes data stored on the server device 102 (e.g., a banking application) and/or transmits a request for application data to the server device 102 in response to the user-input.

Preferably, a system administrator may launch the client application 266 from a client device, such as one of the client devices 106-116, to communicate with the server device 102 to implement the resiliency prediction system 100. Additionally, the system administrator may also launch or instantiate any other suitable user interface application (e.g., the native application or web browser 270, or any other one of the plurality of software applications 264) to access the server device 102 to realize the resiliency prediction system 100.

Figure 4:
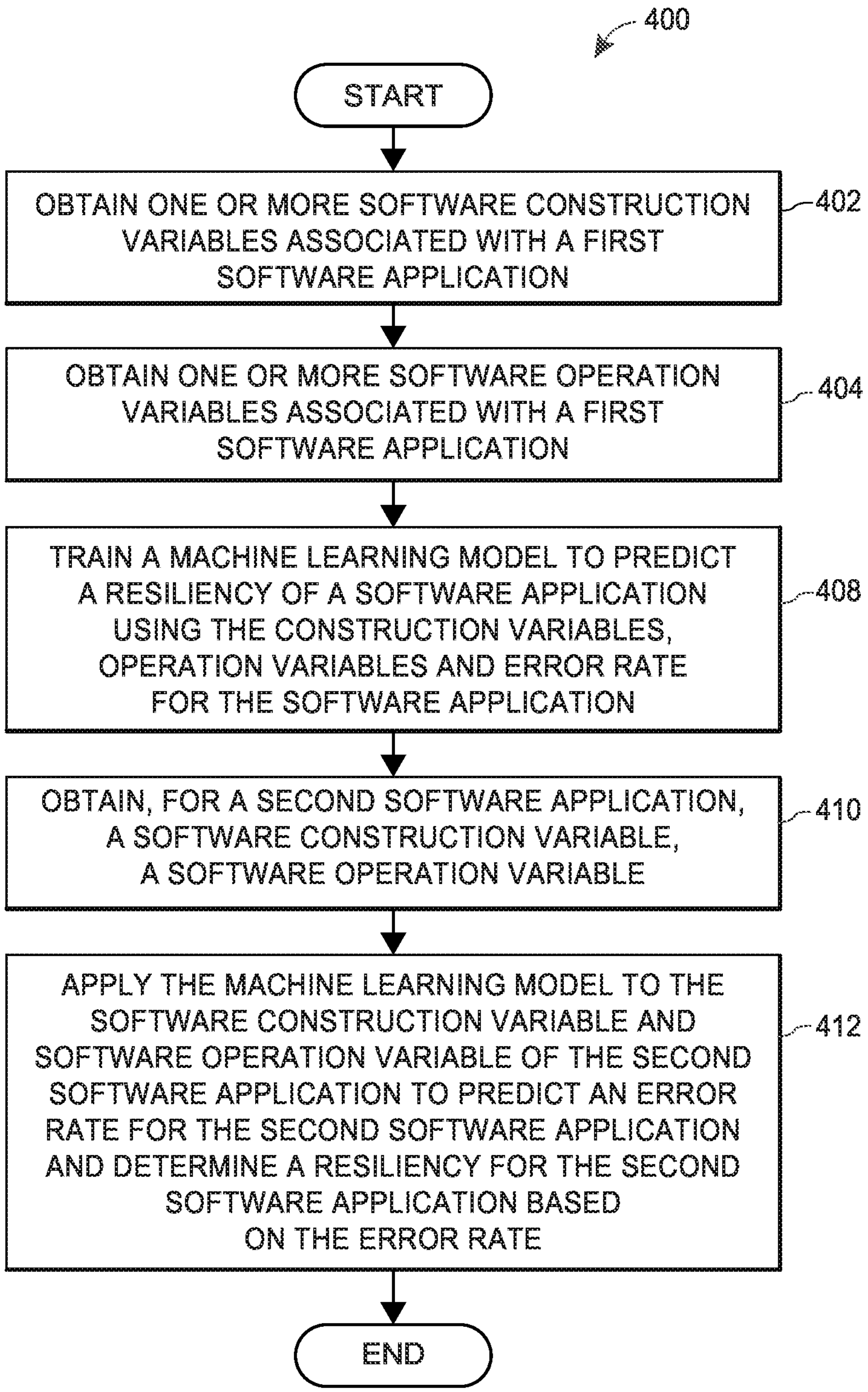
FIG. 4 depicts a flow diagram representing an exemplary computer-implemented method for predicting resiliency of software applications, according to one embodiment.

III. Exemplary Flow Diagram for Predicting Resiliency of Software Applications FIG. 4 depicts a flow diagram representing an exemplary computer-implemented method 400 for predicting a resiliency of a software application. The method 400 may be executed on the server device 102. In some embodiments, the method 400 may be implemented in a set of instructions stored on a non-transitory computer-readable memory and executable on one or more processors of the server device 102. For example, the method 400 may be performed by the training module 134 and/or the software resiliency module 136 of FIG. 1.

The training module 134 may obtain characteristics of a first set of software applications having known error rates as training data. More specifically, for the first set of software applications, the training module 134 may obtain one or more software construction variables associated with the first set of software applications (block 402). The software construction variables may include: (i) a metric related to software source code (e.g., a code structure metric), (ii) a metric related to metadata about the source code, (iii) a code complexity metric, (iv) a code quality metric, (v) a metric related to the vulnerability of the source code, (vi) automated and manual testing data, (vii) automated and manual validation data, (viii) software delivery data, and/or (ix) software deployment data (e.g., code deployment metric).

For example, some metrics related to software source code may relate to various categories, such as the size (e.g., the number of lines of code), complexity, coupling, cohesion, and/or inheritance of the source code. The complexity of the source code may relate to the ability of the source code to be modified and maintained. The lower the complexity of the source code, the better the software is designed. The complexity of the source code may be one potential variable that could impact an application. A sample size of many applications, where each application has a different code complexity metric, software application resiliency trends over time, and the correlated risk factor may be used to develop a risk score on an app-to-app basis.

The coupling of the source code may be the number of connections a file or function has to other files or functions, where the lower the coupling the better the code. A lower coupling also may indicate a higher modularity. Cohesion measures how strongly the module, package, or component can do internally what it is intended to do by not having to utilize data elements outside of the module. Good software has low coupling and high cohesion. The inheritance metric applies to object-oriented software, and the less complex the inheritance makes the software easier to understand and maintain. For example, the code structure metric may be determined based upon at least one of (i) cyclomatic complexity data, (ii) pattern scanning data, (iii) modularity data, and/or (iv) a number of lines of code.

The metric related to the source code metadata may be based upon the date the software was created, the date the software was modified, the file size, changes to the file size, etc. For example, the source code metadata metric may be the amount of time since the software was created. The code complexity metric may indicate the complexity of the source code. For example, the code complexity metric may be the quantitative measure of the number of linearly independent paths through a program's source code. The code quality metric may include several variables to measure the quality of the source code, such as code clarity, code reusability, code portability, etc. The metric related to vulnerability of the source code may include quantitative aspects of software security, (e.g., what is the potential for a security breach or is there a defect that enables the ability to bypass security measures).

The automated and manual testing data may include testing data for security testing, performance testing, or regression testing and/or any data that may identify weaknesses/failures in the software application. The automated and manual validation data may be any data that checks the accuracy and quality of the source data prior to processing the data.

The software delivery data may verify the software has robust security, thorough testing, and/or is fully integrated in order to be deployed. The software deployment data may include all the steps, processes and activities required to make the software application available for its intended users, which may include a combination of manual and automated processes. For example, the code deployment metric may include: (i) a production change frequency metric, (ii) a production change size metric, and/or (iii) a production change error rate. For example, the production change frequency may be number of times the code changes. The production change size metric may be the size of the changes to the code. More specifically, the size may be the number of lines of codes which were added or deleted.

Each metric associated with software construction variables may be assigned a value, for example, ranging from 1 to 10 based upon the quality of the software code. For instance, the code structure metric may be assigned a value of 9.5 for software code that may have high quality, high clarity, high reusability, and high portability.

Additionally, for the first set of software applications, the training module 134 may obtain one or more software operation variables associated with the first set (block 404). The software operation variables may include: (i) execution data, which may include the input variables required to execute the software application, (ii) environment data, which may include one set of data for one environment (e.g., a test environment) and another set of data for a different environment (e.g., an operational environment) (iii) any data that impacts the operation of the software application, (iv) log data, which may include a set of data about the operation of the software application that assists in determining whether resources are performing properly and optimally, (v) availability data, which may include how often the software operation variables are available during the execution of the software application, and/or (vi) runtime data, which may include the input and output data for one or more functions, subroutines, and/or routines that are available during the execution of the software application. Further, the runtime data may include: (i) performance data, which may include the number of times the software application fails, (ii) application error data, which may include the input and output data that may cause an error in the software application, (iii) application-to-application runtime dependency data, which identifies one or more applications that delay the operation of one or more applications causing errors at runtime, (iv) infrastructure runtime dependency data, (v) a number of runtime incidents, which includes the number of incidents (not necessarily failures) that occur with the software application when it operates at runtime, (vi) outage data, which includes the number of problems in the software application that may lead to failures, and/or (vii) error data, which includes the data that is generated when a failure occurs with the software application.

Moreover, for the first set of software applications, the training module 134 may obtain an error rate for each application in the first set. The error rate may be the total number of errors divided by the number of transactions handled by the software application.

At block 308, the training module 134 may train a machine learning module to predict an error rate for a software application using the software construction variables, software operation variables, and error rates for the software applications in the first set. The error rate may be the total number of errors divided by the number of transactions handled by the software application. In some embodiments, artificial intelligence and/or machine learning based algorithms may be used to train the machine learning model. The algorithms may include a library or package that is executed on the server 102 (or other computing devices not shown in FIG. 1). For example, such libraries may include the TENSORFLOW based library, the PYTORCH library, and/or the SCIKIT-LEARN Python library. Machine learning may involve identifying and recognizing patterns in existing data in order to facilitate making predictions or identification for subsequent data.

Machine learning model(s) may be created and trained based upon example data (e.g., "training data") inputs or data (which may be termed "features" and "labels") in order to make valid and reliable predictions for new inputs, such as testing level or production level data or inputs. In supervised machine learning, a machine learning program operating on a server, computing device, or otherwise processor (s), may be provided with example inputs (e.g., "features" such as the software construction variables and the software operation variables) and their associated, or observed, outputs (e.g., "labels" such as the error rates) in order for the machine learning program or algorithm to determine or discover rules, relationships, patterns, or otherwise machine learning "models" that map such inputs (e.g., "features" such as the software construction variables and the software operation variables) to the outputs (e.g., labels such as the error rates), for example, by determining and/or assigning weights or other metrics to the model across its various feature categories. Such rules, relationships, or otherwise models may then be provided subsequent inputs in order for the model, executing on the server, computing device, or otherwise processor(s), to predict, based upon the discovered rules, relationships, or model, an expected output.

In unsupervised machine learning, the server, computing device, or otherwise processor(s), may be required to find its own structure in unlabeled example inputs, where, for example multiple training iterations are executed by the server, computing device, or otherwise processor(s) to train multiple generations of models until a satisfactory model, e.g., a model that provides sufficient prediction accuracy when given test level or production level data or inputs, is generated. The disclosures herein may use one or both of such supervised or unsupervised machine learning techniques.

In order to train the training module 134, processor 132 may access the first set of software applications from the software app database 124. The processor 132 can determine one or more software construction variables and one or more software operation variables associated with each software application in the first set. The processor 132 may further obtain an error rate for each of the first set of software applications. The processor 132 may then use the software construction variables, the software operation variables, and the error rate for each software application in the first set to train the machine learning model to predict a resiliency of a software application.

At block 410, the software resiliency module 136 may obtain a second software application, where the error rate for the second software application is unknown. The processor 132 may determine software construction variable(s) associated with the second software application and software operation variable(s) associated with the second software application.

At block 412, the software resiliency module 136 may access the trained machine learning model generated by the training module 134. The software resiliency module 136 may apply the software construction variable(s) associated with the second software application and the software operation variable(s) associated with the second software application to the trained machine learning model to predict an error rate for the second software application. The software resiliency module 136 may also determine an application risk score based upon the predicted error rate. For example, the application risk score may be directly proportional to the predicted error rate.

In addition, the software resiliency module 136 may determine the resiliency of the second software application based upon the error rate. In one embodiment, the software resiliency module 136 may provide an indication of the likelihood of resiliency issues for the second software application. In another embodiment, the software resiliency module 136 may provide an indication of the severity of resiliency issues for the second software application.

IV. Exemplary Set of Applications

Turning now to FIG. 5, FIG. 5 depicts a table 500 of an exemplary set of software applications 502 and their respective error rates 508 which may be used as training data to train the machine learning model. The training data may include software applications 502 including a car insurance application 510, an underwriting application 512, a banking application 514, a life insurance application 516, and a claims application 518. For each software application 502, there are associated software construction variables 504, software operational variables 506, and error rates that are used to train the machine learning model.

V. Exemplary Set of Features

Figure 6:
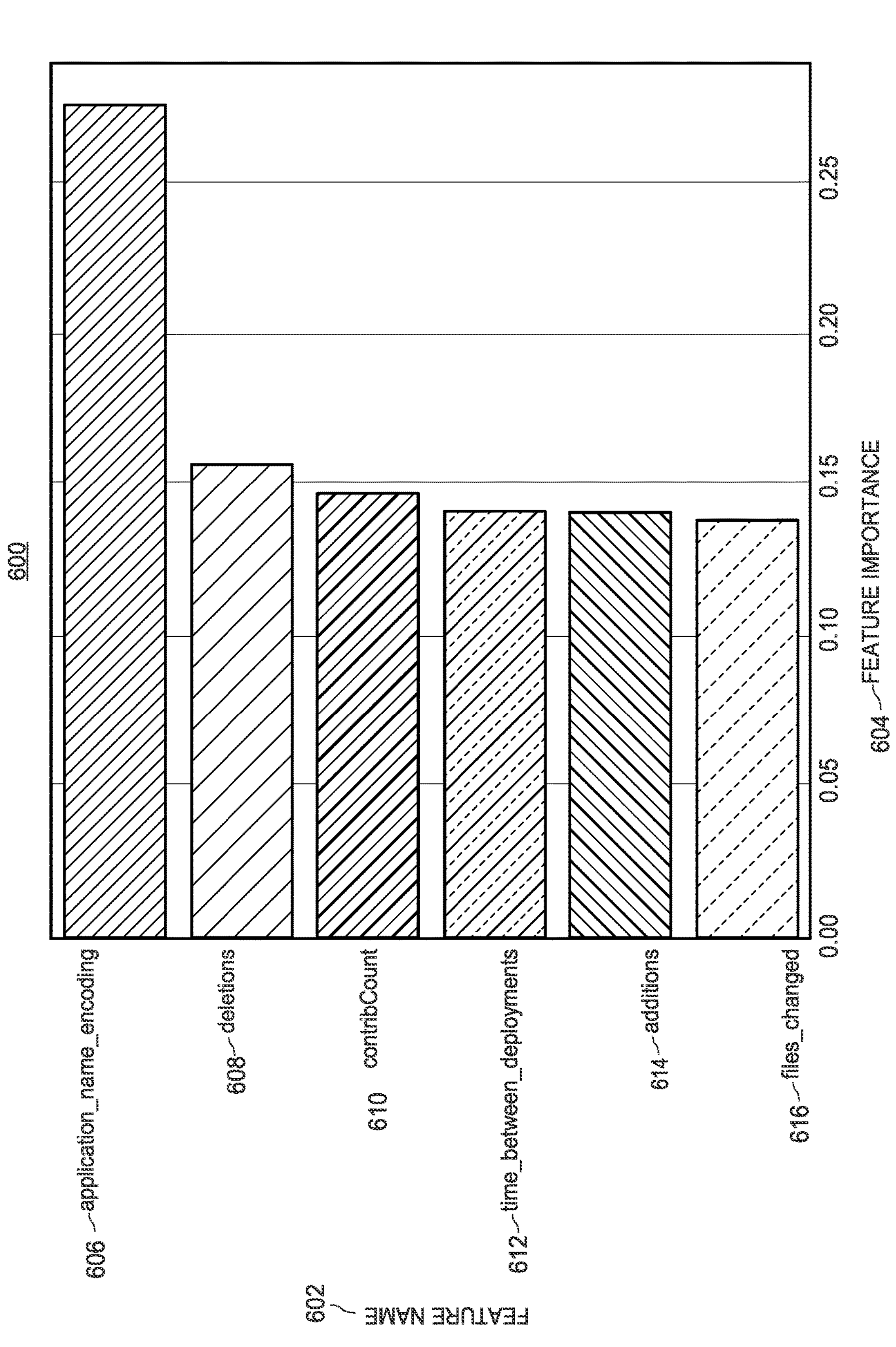
FIG. 6 depicts an exemplary set of features used to predict the error rate for an exemplary software application, according to one embodiment.

Now turning to FIG. 6, FIG. 6 depicts an exemplary set of features used to predict the error rate for an exemplary software application. In this particular machine learning model (e.g., extreme gradient boosting), the machine learning model identifies six features 602 as the most important features for predicting the error rate (e.g., an application name encoding 606, a number of deletions 608, a contribution count 610, a time between deployments 612, a number of additions 614, and a number of files changed 616). There may be additional metrics that are not listed or discussed below that also may affect the error rate, but these six features 602 have been identified as having the most significant impact on the error rate.

Each feature 602 has an associated level of importance 604. For instance, the application name encoding 606 has the highest level of importance for predicting the error rate. This may be because software applications with the same or similar names are likely to have similar code and thus similar resiliency issues. The application name encoding 606 may be a number assigned to the name of each application or a number assigned to a term within the name. For example, each application having the term "insurance" in the name may be encoded with the same number.

Further, the number of deletions 608 of software packages, subprograms, functions, or subroutines can contribute to failures in software applications leading to higher error rates. For example, a deletion 608 of an invoked object that is used by a subroutine or function at one layer of the program and later called by a routine of a subordinate program may cause an error.

In addition, the contribution count 610 may be correlated with the number of errors in a software application. For example, as more changes and updates are added to the software application the likelihood of errors increases because i) contributions made to fix a certain error may lead to other errors and/or ii) the contributions may lead to new functionality that may include additional errors.

Another feature that may be correlated with a high error rate in a software application is the time between deployments 612. The time between deployments 612 may be determined based upon the frequency of changes to the software application. For instance, if the product changes frequently and the software changes associated with those product changes are deployed often, the time between deployments 612 will be shorter, which may correspond to an increase in the likelihood of errors.

Additions 614 to a software application, further, may be correlated with a high error rate. For example, an addition 614 of a function, subroutine, and/or subprogram may cause an error if the added function, subroutine, and/or subprogram requires the same information that is being used by another function, subroutine, and/or subprogram.

Another feature, for example, that is correlated with a high error rate is how often the file is changed 616. If files that create a software application are frequently changed 616, errors may result in the operation of the software application.

As FIG. 6 indicates, the various features have various effects on the error rate of the software application ranging from a feature importance 604 of 0 to 0.25. As mentioned above, for the software application, the highest correlation with the error rate for the software application is the application name encoding 606, at over 0.25. The correlation between deletions 608 to the software application and the error rate is just over 0.15. The remaining features (e.g., contribution count 610, time between deployments 612, additions 614, and files changed 616) have a correlation to the error rate which is less than 0.15 each.

VI. Exemplary Risk Score Display

Figure 7:
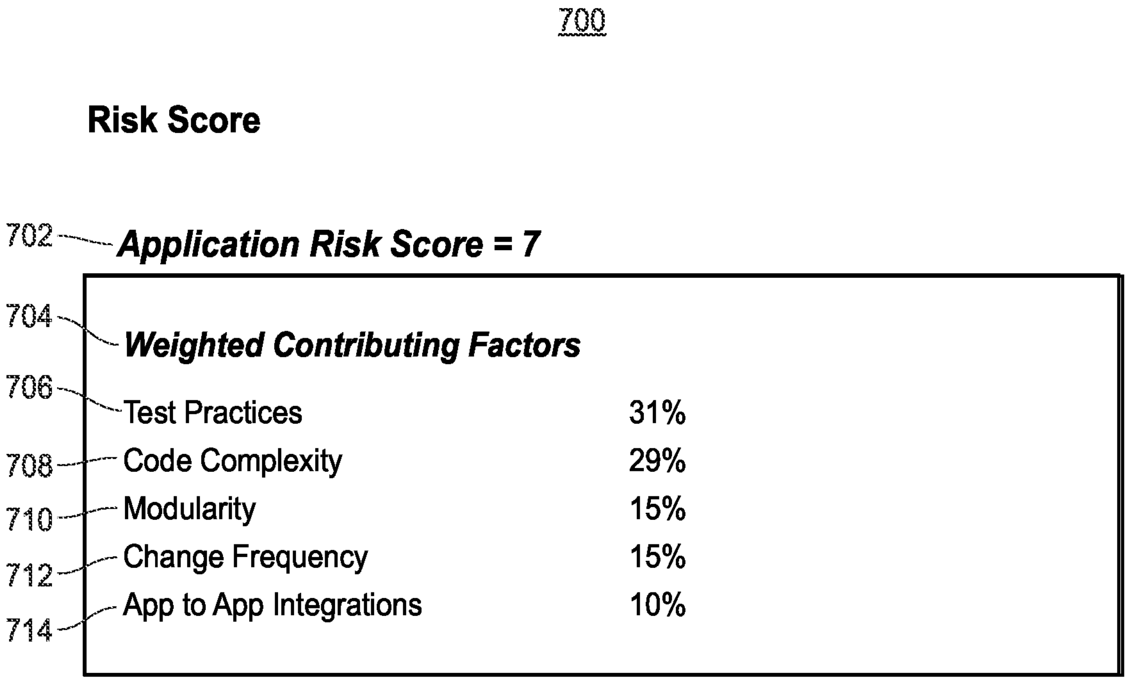
FIG. 7 depicts an exemplary risk score display for an exemplary software application, according to one embodiment.

Now turning to FIG. 7, an exemplary risk score display 700 for a particular software application may be presented on the user interface of a client device 106-116. The risk score display 700 may include an application risk score 702 which represents the total resiliency risk and is based upon a ten-point scale. The risk score display 700 also may include a series of weighted variables or risk factors 704 which contributed to the application risk score 702. The weight of each risk factor may be derived from the historical behavior of the software application and is a predictive indicator of where failure is likely to occur in the future.

For instance, risk factors may include a test practices factor 706, a code complexity factor 708, a modularity factor 710, a change frequency factor 712, and an app-to-app integrations factor 714. The test practices factor 706 may be a value, for example, ranging from 1 to 10 based upon the quality of the test practices of the software application. For instance, the test practices for a software application may be assigned a value of 9 when the software application has been tested thoroughly and according to acceptable testing standards. The app-to-app integrations factor 714 may be a numeric metric indicating the number of integrations the software application has with other applications.

In this particular case, the test practices factor 706 may be assigned a value of 31% indicating that test practices contributed 31% of the total resiliency risk. The code complexity factor 708 may be assigned a value of 29%, the modularity factor 710 may be assigned a value of 15%, the change frequency factor 712 may be assigned a value of 15%, and the app-to-app integrations factor 714 may be assigned a value of 10%. The weighted contributions 706-714 may be similar to the levels of importance shown in FIG. 6. Based on the weighted contributions 706-714, the test practices factor 706 contributes the most to the application risk score 702 followed by the code complexity 708.

As mentioned above, the software resiliency module 136 may predict the likelihood and severity of resiliency issues for the software application and provide the likelihood and severity of the resiliency issues to the client device 106-116. The client device 106-116 may then present an indication of the likelihood and severity of the resiliency issues on a display. Also, as mentioned above, the software resiliency module 136 may predict a single error rate (e.g., 0.6) with a single likelihood (e.g., 70%) for a software application.

In other implementations, the software resiliency module 136 may predict multiple error rates (e.g., 0.6, 0.4, 0.2) with different likelihoods (e.g., 70%, 15%, 5%) for the software application. The software resiliency module 136 may then generate a likelihood metric and a severity metric based upon the different error rates and corresponding likelihoods. For example, if the likelihood of a particular error rate exceeds a threshold likelihood, the software resiliency module 136 may use this likelihood for the likelihood metric. In another example, the software resiliency module 136 may generate the likelihood metric by aggregating likelihoods for error rates within a threshold range of each other or which exceed a threshold error rate.

Furthermore, if the likelihood of a particular error rate exceeds a threshold likelihood, the software resiliency module 136 may use the particular error rate for the severity metric. In another example, the software resiliency module 136 may generate the severity metric by combining or averaging error rates within a threshold range of each other or which exceed a threshold error rate. In yet another example, the software resiliency module 136 may generate the severity metric by taking a weighted average of the error rates according to their corresponding likelihoods.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising." "includes," "including." "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluation properties, through the principles disclosed herein. Therefore, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality and improve the functioning of conventional computers.

The invention claimed is:

1. A computer-implemented method for predicting resiliency of software applications, the method executed by one or more processors programmed to perform the method, the method comprising:

for each of a plurality of first software applications:

obtaining, by one or more processors, one or more software construction variables associated with the first software application;

obtaining, by the one or more processors, one or more software operation variables associated with the first software application; and obtaining, by the one or more processors, an error rate for the first software application indicating a total number of errors divided by a number of transactions handled by the first software application;

training, by the one or more processors, a machine learning model to predict a resiliency of a particular software application using (i) the one or more software construction variables associated with each of the plurality of first software applications, (ii) the one or more software operation variables associated with each of the plurality of first software applications, and (iii) the error rate for each of the plurality of first software applications, wherein the training includes performing a plurality of iterations of training until a trained machine learning model is generated having prediction accuracy above a threshold;

for a second software application, obtaining, by the one or more processors, at least one software construction variable and at least one software operation variable associated with the second software application;

applying, by the one or more processors, the trained machine learning model to the at least one software construction variable and the at least one software operation variable associated with the second software application to predict an error rate for the second software application and determine a resiliency for the second software application based upon the predicted error rate including determining a severity of resiliency issues for the second software application and determining a likelihood of resiliency issues for the second software application, wherein the severity of resiliency issues for the second software application is determined by comparing the predicted error rate to one or more error rate thresholds, and the likelihood of resiliency issues for the second software application is based on a likelihood of the prediction of the error rate for the second software application; and presenting, by the one or more processors, a display including (i) an indication of a risk score based on the severity and/or likelihood of resiliency issues for the second software application, (ii) indications of a plurality of risk factors which contributed to the risk score, and (iii) weighted contributions of each risk factor to the risk score.

2. The computer-implemented method of claim 1, wherein the software construction variables comprise at least one of (i) a metric related to software source code, (ii) a metric related to metadata about the source code, (iii) a code complexity metric, (iv) a code quality metric, (v) a metric related to vulnerability of source code, (vi) automated and manual testing data, (vii) automated and manual validation data (viii) software delivery data, (ix) software deployment data, (x) a code structure metric, and (xi) a code deployment metric.

3. The computer-implemented method of claim 2, wherein the code structure metric is determined based upon at least one of (i) cyclomatic complexity data, (ii) pattern scanning data, (iii) modularity data, and (iv) a number of lines of code.

4. The computer-implemented method of claim 2, wherein the code deployment metric comprises at least one of (i) a production change frequency metric, (ii) a production change size metric, and (iii) a production change error rate.

5. The computer-implemented method of claim 1, where the software operation variables comprise at least one of (i) execution data, (ii) environment data, (iii) any data that impacts the operation of the software application, (iv) log data, (v) availability data, and (vi) runtime data.

6. The computer-implemented method of claim 5, wherein the runtime data comprises at least one of (i) performance data, (ii) application error data, (iii) application-to-application runtime dependency data, (iv) infrastructure runtime dependency data, (v) a number of runtime incidents, (vi) outage data, and (vii) error data.

7. The computer-implemented method of claim 5, further comprising:

identifying, by the one or more processors, a subset of the one or more software construction variables and the one or more software operation variables having a correlation with the error rate which is above a threshold; and training, by the one or more processors, the machine learning model using the identified subset.

8. The computer-implemented method of claim 1, wherein the machine learning model correlates the one or more software construction variables and the one or more software operation variables to the error rate for each of the plurality of first software applications.

9. The computer-implemented method of claim 1, wherein the resiliency for the second software application is inversely proportional to the predicted error rate.

10. The computer-implemented method of claim 1, wherein:

determining the severity of resiliency issues for the second software application includes applying, by the one or more processors, the at least one software construction variable and the at least one software operation variable associated with the second software application to a first machine learning model to determine the severity of resiliency issues for the second software application, and determining the likelihood of resiliency issues for the second software application includes applying, by the one or more processors, the at least one software construction variable and the at least one software operation variable associated with the second software application to a second machine learning model to determine the likelihood of resiliency issues for the second software application.

11. A system for predicting resiliency of software applications, the system comprising:

one or more processors; and a non-transitory computer-readable memory coupled to the one or more processors and storing thereon instructions that, when executed by the one or more processors, cause the system to:

for each of a plurality of first software applications:

obtain one or more software construction variables associated with the first software application;

obtain one or more software operation variables associated with the first software application; and obtain an error rate for the first software application indicating a total number of errors divided by a number of transactions handled by the first software application;

train a machine learning model to predict a resiliency of a particular software application using (i) the one or more software construction variables associated with each of the plurality of first software applications, (ii) the one or more software operation variables associated with each of the plurality of first software applications, and (iii) the error rate for each of the plurality of first software applications, wherein to train the machine learning model, the instructions cause the system to perform a plurality of iterations of training until a trained machine learning model is generated having prediction accuracy above a threshold;

for a second software application, obtain at least one software construction variable and at least one software operation variable associated with the second software application;

apply the trained machine learning model to the at least one software construction variable and the at least one software operation variable associated with the second software application to predict an error rate for the second software application and determine a resiliency for the second software application based upon the predicted error rate including determining a severity of resiliency issues for the second software application and determining a likelihood of resiliency issues for the second software application, wherein the severity of resiliency issues for the second software application is determined by comparing the predicted error rate to one or more error rate thresholds, and the likelihood of resiliency issues for the second software application is based on a likelihood of the prediction of the error rate for the second software application; and present a display including (i) an indication of a risk score based on the severity and/or likelihood of resiliency issues for the second software application, (ii) indications of a plurality of risk factors which contributed to the risk score, and (iii) weighted contributions of each risk factor to the risk score.

12. The system of claim 11, wherein the software construction variables comprise at least one of (i) a metric related to software source code, (ii) a metric related to metadata about the source code, (iii) a code complexity metric, (iv) a code quality metric, (v) a metric related to vulnerability of source code, (vi) automated and manual testing data, (vii) automated and manual validation data (viii) software delivery data, (ix) software deployment data, (x) a code structure metric, and (xi) a code deployment metric.

13. The system of claim 12, wherein the code structure metric is determined based upon at least one of (i) cyclomatic complexity data, (ii) pattern scanning data, (iii) modularity data, and (iv) a number of lines of code.

14. The system of claim 12, wherein the code deployment metric comprises at least one of (i) a production change frequency metric, (ii) a production change size metric, and (iii) a production change error rate.

15. The system of claim 11, wherein the software operation variables comprise at least one of (i) execution data, (ii) environment data, (iii) any data that impacts the operation of the software application, (iv) log data, (v) availability data, and (vi) runtime data.

16. The system of claim 15, wherein the runtime data comprises at least one of (i) performance data, (ii) application error data, (iii) application-to-application runtime dependency data, (iv) infrastructure runtime dependency data, (v) a number of runtime incidents, (vi) outage data, and (vii) error data.

17. The system of claim 11, wherein the machine learning model correlates the one or more software construction variables and the one or more software operation variables to the error rate for each of the plurality of first software applications.

* * * * *